United States Patent
Schmitt et al.

(10) Patent No.: US 9,383,447 B2
(45) Date of Patent: Jul. 5, 2016

(54) LIDAR METHOD FOR MEASURING SPEEDS AND LIDAR DEVICE WITH TIME-CONTROLLED DETECTION

(75) Inventors: Nikolaus Schmitt, Brunnthal-Otterloh (DE); Wolfgang Rehm, Hergensweiler (DE); Thomas Pistner, München (DE)

(73) Assignee: EADS Deutschland GmbH, Ottobrunn (DE)

( * ) Notice: Subject to any disclaimer, the term of this patent is extended or adjusted under 35 U.S.C. 154(b) by 777 days.

(21) Appl. No.: 13/002,479

(22) PCT Filed: Jun. 30, 2009

(86) PCT No.: PCT/EP2009/058213
§ 371 (c)(1),
(2), (4) Date: Apr. 18, 2011

(87) PCT Pub. No.: WO2010/000751
PCT Pub. Date: Jan. 7, 2010

(65) Prior Publication Data
US 2011/0181864 A1    Jul. 28, 2011

(30) Foreign Application Priority Data
Jul. 4, 2008    (DE) .................. 10 2008 031 681

(51) Int. Cl.
*G01P 3/36*    (2006.01)
*G01S 17/95*    (2006.01)
*G01S 17/58*    (2006.01)

(52) U.S. Cl.
CPC *G01S 17/95* (2013.01); *G01S 17/58* (2013.01)

(58) Field of Classification Search
CPC ............. G01P 3/36; G01P 5/28; G01P 3/366; G01S 17/58; G01S 17/95; G01S 17/10; G01B 7/32; G01C 3/08
USPC ............. 356/3.01–3.15, 4.01–4.1, 5.01–5.15, 356/28, 28.5, 337, 342
See application file for complete search history.

(56) References Cited

U.S. PATENT DOCUMENTS 4,195,931 A    4/1980    Hara
5,394,238 A *    2/1995    Mocker et al. ................ 356/342
(Continued)

FOREIGN PATENT DOCUMENTS

| DE | 4013702 A1 | 10/1991 |
| DE | 10316762 A1 | 11/2004 |
| EP | 1756620 B1 | 1/2008 |

OTHER PUBLICATIONS

The International Research Report of corresponding European Application No. PCT/EP2009/058213, dated Nov. 11, 2009.
The Office Action of corresponding German Application No. 10 2008 031 681.4-55, dated Mar. 31, 2009.
Schmitt et al: "The AWIATOR airborne LIDAR turbulence sensor" Aerospace Science and Technology, Editions Scientifiques et Medicales Elsevier, Bd. 11, Nr. 7-8, 1. Nov. 1, 2007, Seiten 546-552, XP022329043 ISSN: 1270-9638.
(Continued)

*Primary Examiner* — Luke Ratcliffe
*Assistant Examiner* — Assres H Woldemaryam
(74) *Attorney, Agent, or Firm* — Global IP Counselors, LLP

(57) ABSTRACT

The invention relates to a method for light detecting and ranging (LIDAR) measurement of speeds, in which a laser beam is directed at the medium to be measured, and radiation which is subsequently emitted from the medium (16) is measured by a detector. In order to optimize the measurement, a spatial measurement range can be selected by activation and/or deactivation of the detector for at least one predetermined or regulated time duration of less than about 500 μs after emission of a laser pulse to the medium to be measured. Furthermore, a direct reception Doppler LIDAR apparatus can be used to perform the method.

26 Claims, 10 Drawing Sheets

(56) References Cited

U.S. PATENT DOCUMENTS

| | | | |
|---|---|---|---|
| 6,384,903 B1* | 5/2002 | Fuller | 356/4.01 |
| 6,894,768 B2* | 5/2005 | Caldwell et al. | 356/28 |
| 7,301,610 B2 | 11/2007 | Langdon | |
| 7,463,341 B2* | 12/2008 | Halldorsson et al. | 356/28.5 |
| 7,495,774 B2* | 2/2009 | Hays et al. | 356/519 |
| 7,505,145 B2* | 3/2009 | Hays et al. | 356/519 |
| 7,508,528 B2* | 3/2009 | Hays et al. | 356/519 |
| 7,518,736 B2* | 4/2009 | Hays et al. | 356/519 |
| 7,522,291 B2* | 4/2009 | Hays et al. | 356/519 |
| 7,554,652 B1* | 6/2009 | Babin et al. | 356/5.03 |
| 8,427,649 B2* | 4/2013 | Hays et al. | 356/450 |
| 2006/0262324 A1 | 11/2006 | Hays et al. | |
| 2007/0171397 A1* | 7/2007 | Halldorsson et al. | 356/28.5 |
| 2008/0043234 A1* | 2/2008 | Mirand et al. | 356/342 |
| 2008/0117433 A1* | 5/2008 | Hays et al. | 356/519 |
| 2009/0310118 A1* | 12/2009 | Halldorsson | 356/28 |
| 2013/0021607 A1* | 1/2013 | Kanvinde et al. | 356/337 |

OTHER PUBLICATIONS

Durand et al: "Aladin Airborne Demonstrator: a Doppler Wind Lidar to prepare ESA's ADM-Aeolus Explorer Mission" Proc of SPIE, [Online] Bd. 6296,2006, Seiten 629610-1-629610-13, XP002553101 Gefunden im Internet: URL:http://spiedl.aip.org/getpdf/servlet/GetPDFServlet?filetype=pdf&id=PSISDG00629600000162961 D000001 &idtype=cvips&prog=normal > [gefunden am Oct. 30, 2009].

Endeman: "ADM-Aeolus, the first spaceborn wind lidar" Proc of SPIE, [Online] Bd. 6409, 2006, Seiten 64090G-1-64090G-15, XP0025531 02 Gefunden im Internet: URL:http://spiedl.aip.org/getpdflservletiGetPDFServlet?filetype=pdf&id=PSISDG00640900000164090GOOOOO 1 &idtype=cvips&prog=normal > [gefunderi am Oct. 30, 2009].

* cited by examiner

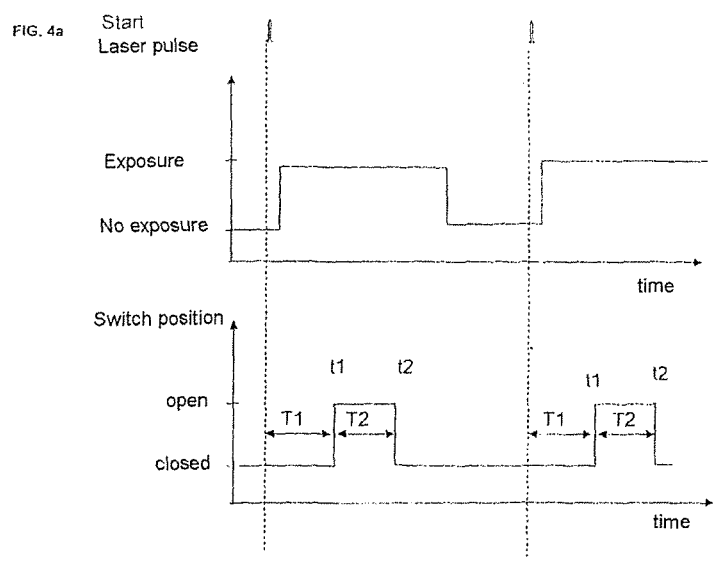

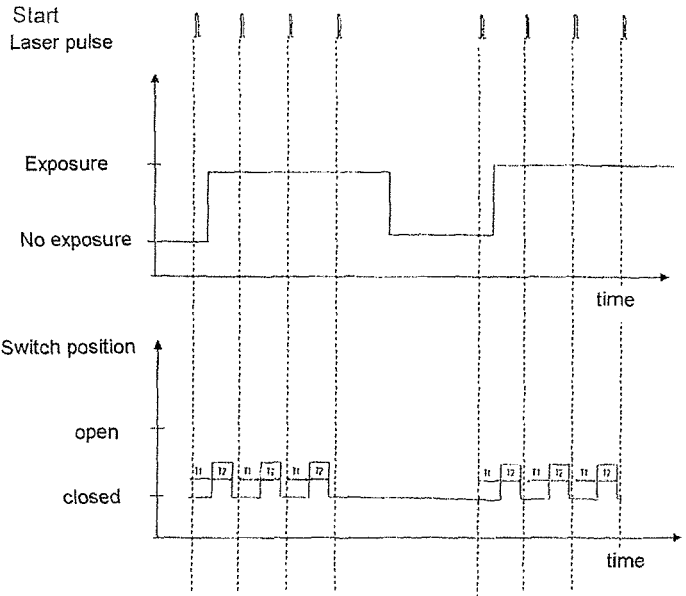

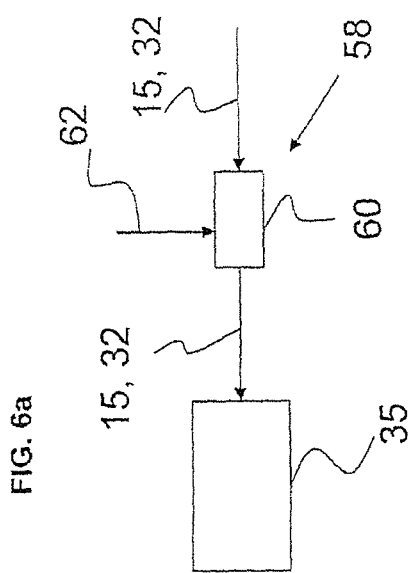
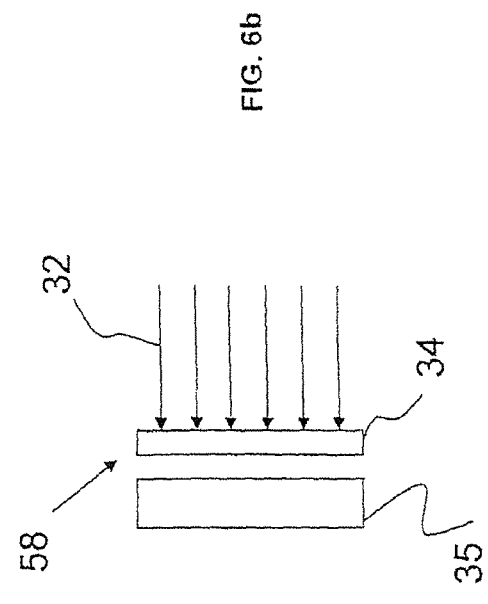

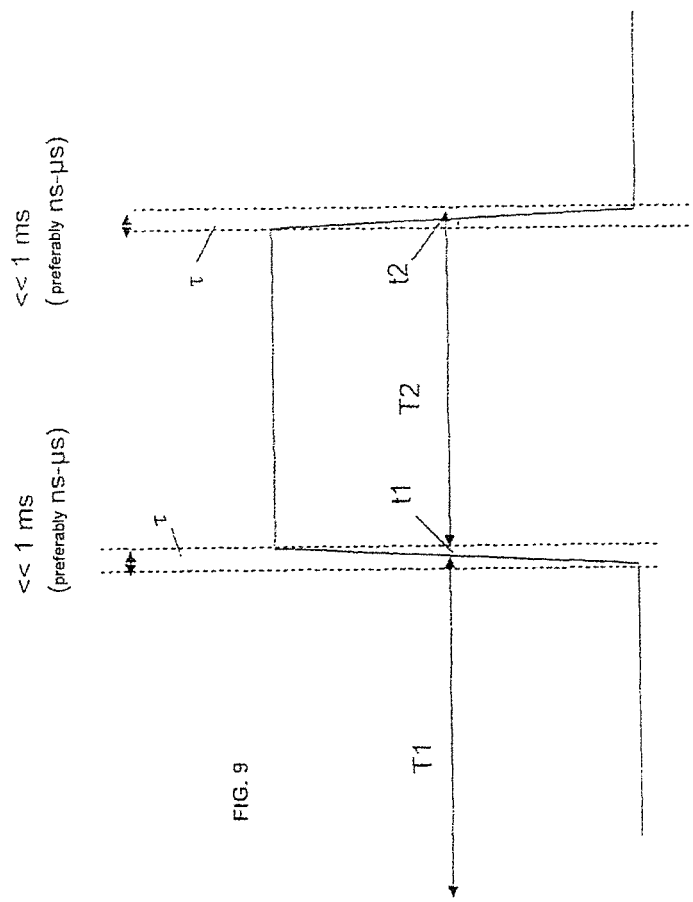

LIDAR METHOD FOR MEASURING SPEEDS AND LIDAR DEVICE WITH TIME-CONTROLLED DETECTION

CROSS-REFERENCE TO RELATED APPLICATIONS

This U.S. National stage application claims priority under 35 U.S.C. §119(a) to German Patent Application No. 10 2008 031 681.4, filed in Germany on Jul. 4, 2008, the entire contents of which are hereby incorporated herein by reference.

BACKGROUND

1. Field of the Invention

The invention relates to a LIDAR method for measuring speeds, and to a LIDAR apparatus for carrying out a LIDAR method such as this.

2. Background Information

LIDAR is short for "light detection and ranging" and is a method, which is close related to radar ("radio-wave detection and ranging") for range and speed measurement, as well as for remote measurement of atmospheric parameters. However, laser beams are used instead of radio waves, as in the case of radar.

One example of a Doppler LIDAR apparatus and of a method which can be carried out using it for measuring wind speeds is known from EP1756620 B1, US 20080117433 A1 or US 2006262324 A1.

In the case of direct reception Doppler LIDAR apparatuses, laser radiation is directed at the medium to be measured, and the radiation which is then reflected is received directly and is investigated for a Doppler shift in the laser wavelength, in order in this way to determine relative speeds.

Doppler LIDAR systems using direct reception technology are used, for example, for predictive measurement of turbulence, crosswinds or vortex trains in front of an aircraft, in particular an airplane. When carried on an aircraft, in particular an airplane, for measurement in front of the aircraft, which is considered in the following text to be a typical application, in addition to providing a pure warning function, the measurement signals can also in particular be injected directly into the aircraft flight control system in order, for example, to proactively regulate out gusts, crosswinds or vortex train influences, that is to say before the aircraft reacts negatively to the external flow change, thus maintaining a constant, smooth flight state, reducing loads on the aircraft, and ensuring safety in the aircraft and for the aircraft.

A number of major problems with previously known LIDAR systems which have been carried on an aircraft and has been designed for similar purposes will be mentioned, by way of example, in the following text:

Reflections back onto an optical window covering the LIDAR system, as a result of surface reflection or dirt, interfere with the measurement.

Background light, in particular background solar radiation in the optical range, must be suppressed, and this is complex.

It is desirable to optimize the measurement range such that the measurement is carried out sufficiently well in front of the aircraft, such that the measurement signals are available in the aircraft before flying through the disturbance. For example, the measurement signals should be injected into the flight control system at an early stage, such that the aircraft can be controlled to respond to the disturbance. However an adequate signal intensity, which decreases as the measurement range increases, should nevertheless be ensured overall for given accuracy requirements. This is not possible with previously known systems.

In previously known systems, the measurement depth cannot be selected or optimized sufficiently flexibly. However, optimization of the measurement depth is desirable such that the measurement can detect the turbulence gradients with sufficient resolution (turbulence gradients, turbulence length and turbulence coherence), while nevertheless overall ensuring an adequate signal intensity, which likewise decreases as the measurement depth decreases, for given accuracy requirements.

SUMMARY

An object of the invention is to optimize a LIDAR measurement method which is in principle suitable for use carried on aircraft, with respect to the abovementioned problems. A further aim is to provide a LIDAR apparatus by means of which the method can be carried out, preferably automatically.

According to the invention, in a method for LIDAR measurement of speeds, wherein a laser beam is directed at the medium to be measured, and radiation which is subsequently scattered from the medium is measured by means of a detector, a spatial measurement range is selected by activation and/or deactivation of the detector with at least one predetermined or regulated time duration $T1$, $T2$ of less than about 500 µs after emission of a laser pulse to the medium to be measured.

Furthermore, according to the invention, a LIDAR apparatus is proposed for measuring speeds having a laser source for transmission of laser radiation to a medium to be measured, having a detector for receiving radiation which is emitted, in particular scattered, by the medium when it is illuminated with the laser radiation. The invention provides that the laser source can transmit a laser pulse, in that a switching device can activate/deactivate the detector as a function of a time of transmission of the laser pulse by the laser source, and in that the switching device is designed to activate/deactivate the detector with at least one predetermined or regulated time duration $T1$, $T2$ of less than about 500 µs after emission of the laser pulse to the medium to be measured.

In one preferred refinement, a LIDAR apparatus is proposed for measuring speeds, having a laser source for transmission of laser radiation to a medium to be measured, having a detector for receiving radiation which is emitted, in particular scattered, by the medium when it is illuminated with the laser radiation, and an evaluation device which determines at least one speed of the medium on the basis of the radiation received by the detector. The laser source can transmit laser pulses i, wherein the pulse duration is shorter than the time required to pass through the measurement range.

The measurement method according to the invention is preferably a Doppler LIDAR measurement method using the direct reception technique. The LIDAR apparatus is accordingly preferably a direct reception Doppler LIDAR apparatus.

Advantageous effects of the invention and/or of its advantageous refinements are the suppression of reflections on an optically transmissive element, such as a cover element and in particular a transmissive window, reduction in the influence of dirt therein, optimization of the measurement range and measurement depth of a LIDAR system, and a very high degree of suppression of background radiation which interferes with detection.

In the present invention it is proposed that a detector, by means of which light coming from a medium which has previously been illuminated with a laser pulse can be detected, can be switched quickly (gating), for example in order to receive only the light scattered back from the desired measurement range and measurement depth.

In advantageous refinements, reflections on a pane and dirt can be suppressed, and the background light can be reduced, by appropriate advantageous selection, for example by rapid switching of the detector. Furthermore, the measurement distance and the measurement depth can be adapted by suitable selection or even dynamic regulation of the switching times (gate times).

According to one development of the invention, for example, the adaption of the switching times can be controlled or regulated also as a function of the intensity of the signal, for example on the basis of changes in the back-scattering characteristic, and system requirements, for example measurement of the LIDAR apparatus' own speed, for example air speed in the case of applications carried on aircraft, expected gust gradients etc. such that the system is always operated at the optimum of the contradictory parameters of measurement range/measurement depth and signal intensity/accuracy requirement.

According to a further development of the invention, the system can be switched between different modes, such as less accurate but more predictive measurement in order to improve safety (negative-g prevention) and improve cruise comfort, or else shorter-range but more accurate measurement for wing load reduction or, at even shorter range, for optical air data measurement.

When the signal intensity changes, for example because of fluctuating back-scatter or less stringent requirements for the measurement range, for example because the air speed has decreased in the case of applications carried on aircraft, the measurement range can be adapted using the means according to one advantageous refinement of this invention.

Likewise, if the signal intensity changes, for example because of fluctuating back-scatter or less stringent requirements for the measurement depth, for example when only long gusts with shallow gradients are expected, the measurement range can be adapted using the means according to one advantageous refinement of this invention.

According to one advantageous refinement of the invention, a Doppler LIDAR system is provided for measuring speeds, for example the air speed, using the direct reception technique, in which the detector is equipped with a rapid switching device with switching times in the region of less than or considerably less than 1 millisecond. The switching device is designed such that, for example, the duration of the exposure of the detector and/or the time of exposure of the detector can be controlled by control electronics or some other control device. The control process is preferably carried out such that the measurement depth and/or the measurement distance can be selected.

A further advantageous aspect of the invention relates to a LIDAR system, in particular a Doppler LIDAR system, for measuring speeds, for example the air speed, using the direct reception technique, in which an imaging detector (for example a camera) or one or more individual light-sensitive elements, for example photo diodes, photo multipliers, are used as a detector. Arrays of such light-sensitive elements, CCD chips or the like can also be used as a detector.

According to a further advantageous aspect of the invention, the switching device has a switching element which is positioned in front of the detector, allows light to pass through in order to activate the detector, and blocks the light for deactivation. Switching is possible between these states, with the short switching times that have been mentioned. Examples of such switching elements are a switchable microchannel plate (gateable microchannel plate), an electrooptical material which is used for switching (for example, LiNbO3), a liquid crystal cell or a micromechanical element which can be moved for switching (for example a micromirror array).

However, instead of or in addition to a switching element such as this, the switching can take place directly adjacent to the detector itself, as well. For this purpose, one advantageous aspect of the invention provides that the switching takes place electrically at the detector. When a light detector array is used as a detector, switching is preferably carried out at each output of each light-sensitive detector element.

According to one advantageous aspect of the invention, the detector remains switched off at least for the time which is required for the light to pass from the beam source to an optical element, in particular such as a window through which the light beam passes into a free space, for example a window in an aircraft skin, and back again to the detector, such that a possible reflection on this optically transmissive element, in particular a window, or a (dirt) layer present thereon, cannot be perceived by the detector.

According to a further advantageous aspect of the invention, the detector is switched again after a time which corresponds to the propagation time of the light from the beam source until it reaches the intended measurement volume, and if appropriate after passing through it and back again to the detector, such that it no longer detects light, thus reducing the detection of any background light.

According to a further advantageous aspect of the invention, the time which corresponds to a minimum measurement range $r1$ and which the light requires from the beam source to the start of the desired measurement volume and, if appropriate, back to the detector, or the maximum measurement range $r2$, which the light requires from the beam source to the end of the desired measurement volume and, if applicable, back to the detector, is selected as a function of measurement parameters such as the required intensity, accuracy, etc. of the detected signal.

According to a further advantageous aspect of the invention, the time which corresponds to a minimum spatial measurement range or measurement volume $r2-r1$ and which the light requires to pass through the measurement range/measurement volume and if appropriate back is selected as a function of system parameters such as the air speed of an aircraft, for example an airplane, in which the LIDAR system is mounted, or other methods which influence the required measurement range.

According to a further advantageous aspect of the invention, the selection of the time durations $T1$, $T1+T2$ which correspond to $r1$, $r2$ is controlled or regulated dynamically during a relatively long-lasting measurement operation.

According to a further advantageous aspect of the invention, the time duration $T2$ which corresponds to a minimum measurement volume $r2-r1$ and which the light requires to pass through the measurement volume and if appropriate back is selected or regulated as a function of measurement parameters such as the required intensity of the detected signal.

According to a further advantageous aspect of the invention, the time which corresponds to a minimum measurement volume $r2-r1$ and which the light requires to pass through the measurement volume and if appropriate back is measured as a function of system parameters such as the expected dynamics of the measurement signal, coherence of an air gust to be measured, etc.

The selection of the time can advantageously be controlled or regulated dynamically during a relatively long-lasting measurement operation.

According to a further advantageous aspect of the invention, the appropriate switching time and/or exposure time are/is selected in accordance with the current requirement, or sequentially in order to carry out different measurement tasks. For example, a long measurement range can be selected for safety/to improve comfort, a short measurement range with increased accuracy can be selected to reduce wing loads, and a very short range can be selected for optical measurement of air data.

According to a further advantageous aspect of the invention, a correspondingly shorter time is used for switching of the detector, to be precise with respect to a time and/or time duration, for measuring a reference signal, which has been taken from the laser arrangement and has not been scattered in the measurement volume.

In particular, the reference signal can be measured periodically or randomly throughout the entire measurement cycle of the LIDAR measurement. The switching times of the detector can correspondingly be varied periodically or randomly in this way.

The abovementioned steps are preferably carried out automatically in an appropriately designed (direct reception Doppler) LIDAR apparatus which, for example, is provided with an appropriately designed and/or programmed control means.

In one particularly preferred refinement of the invention, at least the first time duration T1 between the transmission of the laser pulse and the switching-on time t1 or other relevant time durations or times is/are controlled or regulated as a function of the speed of a carrier of the LIDAR apparatus. A measurement volume that is fixed in position in a fixed-position coordinate system can thus be measured in particular from a moving system, such as an aircraft or the like. In one specific practical exemplary refinement, for example, the first time duration T1 within an exposure which is carried out using a plurality of the laser pulses is shortened from one pulse to the next such that the measurement volume is constant in the air-related external coordinate system for each recorded laser pulse, despite the movement of the carrier (for example aircraft) itself.

BRIEF DESCRIPTION OF THE DRAWINGS

Exemplary embodiments of the invention will be explained in more detail in the following text with reference to the attached drawings, in which:

FIG. 4a shows a schematic illustration of a time diagram with switching-on and switching-off times for switching the detector arrangement;

FIG. 4b shows a schematic illustration, analogous to FIG. 4a, of a time diagram for the times for switching the detector arrangement on and off, with a plurality of switching processes within an exposure time;

FIG. 6a shows a schematic illustration of one exemplary embodiment for a detector with a switch in front of it;

FIG. 6b shows a schematic illustration of a further exemplary embodiment for a detector with a CCD array, and with a microchannel plate as a switch;

FIG. 9 shows a schematic illustration of switching flanks τ for activation and/or deactivation of the detector.

DETAILED DESCRIPTION OF EMBODIMENTS

Figure 1:
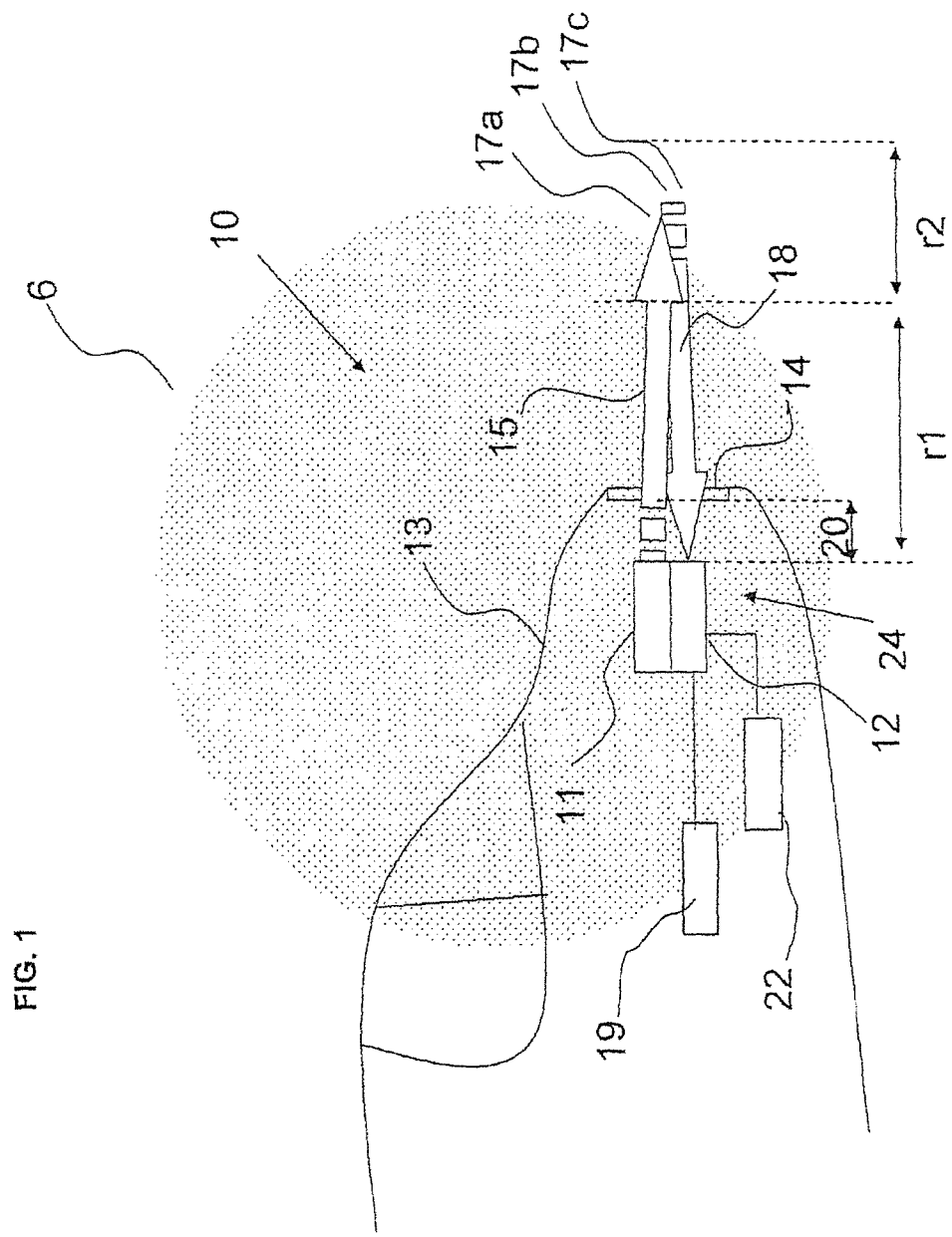
FIG. 1 shows a schematic illustration of a LIDAR apparatus carried on an aircraft, using the example of a measurement arrangement of a LIDAR for predictive turbulence measurement in an aircraft, with three paths r1, r2, 20 being shown.

FIG. 1 shows a schematic illustration of a direct reception Doppler LIDAR apparatus 10. The direct reception Doppler LIDAR apparatus 10 in the illustrated example is fitted in an aircraft, illustrated using the example of an airplane 13, as a carrier.

As will now be discussed, embodiments of the present invention provide, in particular, a Doppler LIDAR system for measuring speeds using the direct reception technique which can be used, for example, for measurement of turbulence in front of an aircraft, for measurement of vortex trains, crosswinds, flows before obstructions, for measurement of wind fields for energy recovery, and so on. The embodiments of the invention therefore relate, in particular, to a Doppler LIDAR measurement of speeds by direct reception, as well as to a direct reception Doppler LIDAR apparatus that can perform the method.

The direct reception Doppler LIDAR apparatus 10 has a laser source 11 with a relatively narrow bandwidth (single-frequency mode, typically several kHz to MHz line width). The light from the laser source 11—transmitted laser beam 15—is transmitted through a window 14 into the atmosphere 16. In the atmosphere 16, the light from the laser source 11 is scattered elastically on particles 17a, 17b, 17c, . . . of the air in the situation illustrated by way of example here. The scattered light 18 is recorded by a detector arrangement 12. The relative speed is determined in an evaluation device 19 from the Doppler shift of the scattered light 18 which has been scattered back on the scattering particles 17a, 17b, 17c, which are moving relative to the direct reception Doppler LIDAR apparatus 10.

Furthermore, a switching device 24 is provided, for example in front of the detector, for switching between an active state, in which light can be detected, and an inactive state, in which light cannot be detected. Furthermore, a control device 22 is provided, by means of which the switching device 24 can be controlled as a function of the transmission of a laser pulse by the laser source 11.

The window 20 is an optically transmissive element for the radiation that is used, in order to cover the direct reception Doppler LIDAR apparatus 10 against environmental influences (cover element), and is located at a specific distance 20 from the laser source 11 and the detector arrangement 12.

In the case of scattering on the particles 17a, 17b and 17c, a distinction is in this context drawn on the one hand between scatter on molecules of the air (Rayleigh scatter) and scatter on aerosols (dust particles, salt particles etc., Mie scatter).

Rayleigh scatter can be measured reliably in all atmospheric layers and independently of meteorological influences; it is dependent only on the particle density, which decreases continuously toward greater heights. In contrast, scattering on aerosols is very highly dependent on their local density, which can vary greatly locally and in particular as a function of weather influences and other influences.

By way of example, aerosol scattering is very strong in regions with high hazardous substance emissions, for example in industrial regions or volcanic regions. In contrast, aerosol scattering is quite low in the area of large waterways, for example over the oceans or in the area of the southern hemisphere of the earth. However, in particular, the aerosols are also washed out, for example by heavy rain, as a result of which their concentration may then be very low.

Overall, the Mie scatter, which is based on the aerosol density, decreases more than proportionally with respect to the Rayleigh scatter on molecules in the air. A measurement based purely on aerosols is therefore unsuitable for reliable measurement of turbulence, etc., and in fact it should also be possible to measure the Rayleigh scatter.

Since the intensity of the Rayleigh scatter is proportional to the reciprocal of the wavelength to the fourth power, it is worthwhile using a laser source 11 with as short a wavelength as possible, that is to say for example in the UV range.

Figure 2:
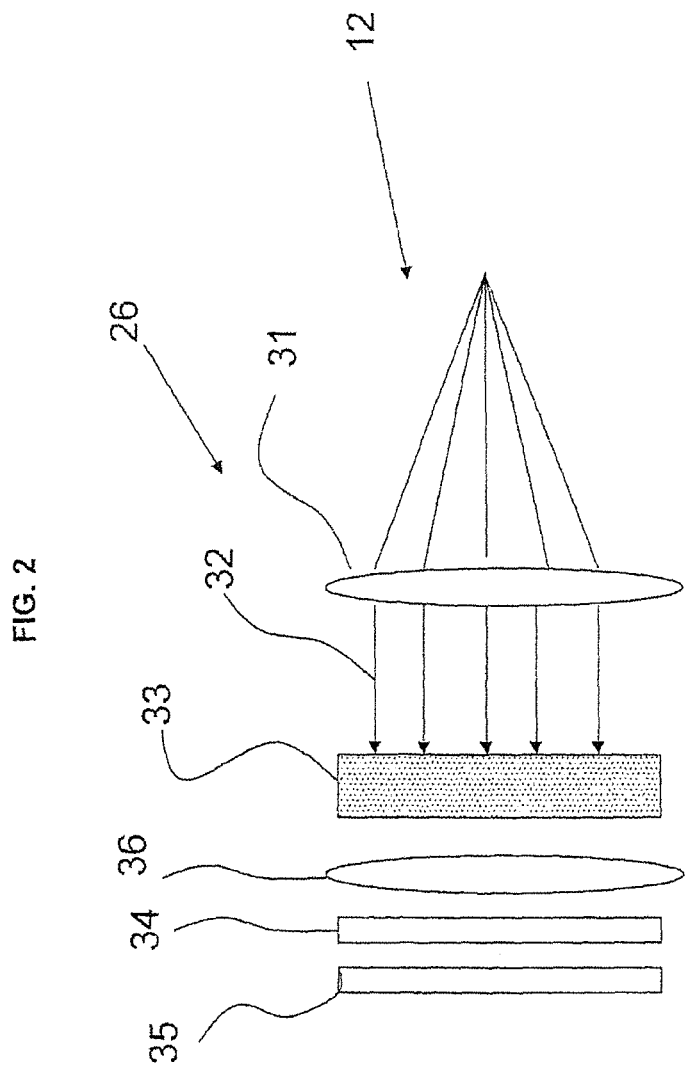
FIG. 2 shows a schematic illustration of a detector arrangement which can be used for the apparatus shown in FIG. 1, using the example of a detector arrangement for direct reception.

One example of the detector arrangement 12 of the direct reception Doppler LIDAR apparatus 10 is illustrated in more detail in FIG. 2. The scattered radiation—scattered light 18—is passed via optics 26 to a detector 35, and is detected.

In principle, two measurement methods can be used to measure a frequency shift. In one measurement method, the so-called coherent detection, the fixed phase relationship between the transmitted laser beam with a sufficiently narrow line width and the received scatter radiation is made use of. Because of the coherence, this measurement method is highly sensitive. In order to measure the frequency shift, a portion of the laser beam is diverted into the atmosphere before transmission, is delayed, and is mixed collinearly with the received scattered radiation on a photodetector with a sufficiently wide bandwidth. Because of the non-linearity of the photodetector, the difference frequency can be tapped off directly as an electrical signal, which corresponds directly to the Doppler shift, and is therefore proportional to the relative speed.

One precondition for this measurement method is that the laser source has sufficiently narrow bandwidth, such that the coherence length of the light is greater than the path-length difference between the delayed reference radiation and the received scattered radiation. Furthermore, the scattered radiation must not itself contribute to any significant line broadening since, otherwise, the coherence would be destroyed. Typical limit values for the maximum line width and broadening in the case of scattering are in the region of a few MHz.

Although the radiation scattered on aerosols now has virtually the same narrow bandwidth as the incident radiation, this does not apply, however, to the radiation which has been scattered on molecules: because of the Boltzmann distribution of the particle velocities, the very light molecules move at high speed (Brownian molecular motion) at normal temperatures well above absolute zero, and this leads to a considerable Doppler broadening, solely because of this effect. Typical values are in the region around 3 GHz. Coherent detection using the method described above (mixing on a photodetector) is therefore impossible for measurement of the Rayleigh scatter.

Therefore, in the method described here and in the direct reception Doppler LIDAR apparatus 10 described here, the so-called direct reception technique as illustrated in FIG. 2 is used to measure the Rayleigh scatter (scatter on molecules) which does not require the phase of the radiation and involves only an intensity measurement. In order to determine the Doppler frequency shift, a further element—for example a Fabry-Perot interferometer, Etalon, other interferometer etc. 33—is provided, which has frequency discrimination or wavelength dispersion.

In the case of the detector arrangement 12 illustrated in FIG. 2, the received radiation 32 is supplied to the detector arrangement 12 for this purpose. The received radiation 32 is supplied via first optics—collimation optics 31—to a so-called Fabry-Perot interferometer 33, which has two plane-parallel, partially reflective plates or a single plane-parallel plate with partial reflection on both surfaces, and this leads to the wave interfering with itself, by self-superimposition of the wave in a resonator.

Figure 3:
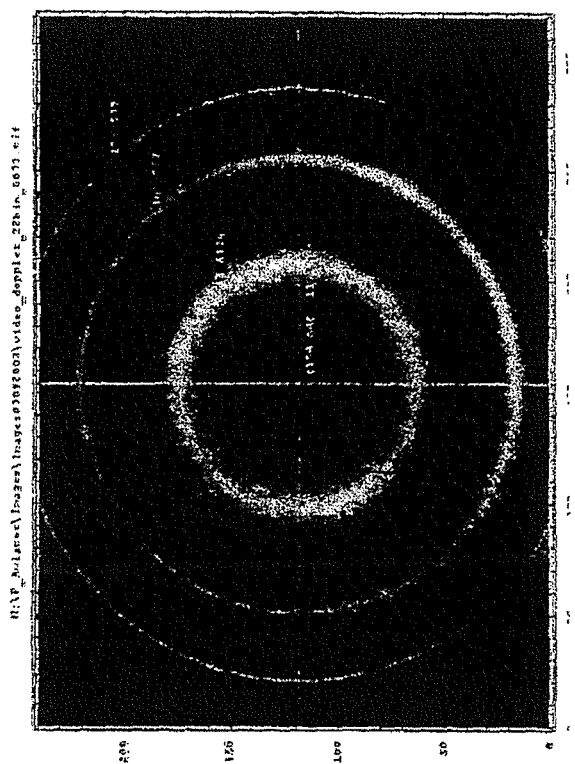
FIG. 3 shows an example of an interferogram (fringe image) recorded using the detector arrangement shown in FIG. 3.

This results in a spatial intensity distribution by imaging by means of second optics 36 on the detector 35. In the illustrated example, multiple reflection results in a circular interference figure—so-called rings or fringes, see FIG. 3. Maxima and minima in this case each correspond to superimpositions of the same angle. A change in the radius of this interference pattern in FIG. 3 is directly proportional to the change in the wavelengths or frequency change of the detected signal, and therefore to the change in the Doppler shift, and therefore the change in the relative velocity of the scatter particles, that is to say for example the scatter particles 17a, 17b, 17c in the air (molecules, aerosols) with respect to the measurement system. By way of example, in the case of systems carried on aircraft, it is therefore also possible to determine the relative velocity of the air with respect to the aircraft 13.

If the radii of the interference pattern are compared, for example, with a signal measured at the same time or at a different time, of the directly derived laser signal, then it is also possible to determine the absolute relative velocity (in contrast to the change in the relative velocity as described above). If this measurement is carried out at the same time or successively in different spatial directions (transmission of the laser beam in different spatial directions and measurement of the back-scattering from this), then the two-dimensional or else three-dimensional relative velocity vector can be determined. The principles and solutions proposed here can be used in a corresponding manner for one or more measurement directions.

This interference pattern, which is illustrated as an example in FIG. 3, can now be recorded using a suitable detector.

The detector arrangement 12 may be designed differently. Different solutions include the use of filters on the edges of the interference maxima of the downstream photodetectors, concentric annular electrodes, which are sensitive to the interference pattern, of a photomultiplier, conversion of the circular pattern to a linear pattern, for example by means of fiber optics, and detection using a CCD line-scan detector, or detection using a two-dimensional photodetector (for example CCD camera). All of these detectors, as well as others, are suitable for the described direct reception Doppler LIDAR apparatus 10. However, for the sake of simplicity, the direct reception Doppler LIDAR apparatus 10 as well as a measurement method which can be carried out using it will be described in more detail using the example of the use of a CCD camera as a detector 35 (see FIG. 2) with a microchannel plate 34 for amplification in front of it. The microchannel plate 34 is also used as a switch, in some embodiments.

The light propagation time is now $n*r/c$, that is to say the refractive index n times the path length r divided by the speed of light in a vacuum c. In the described case of a so-called monostatic system in which a transmitter—in this case: the laser source 11—and a receiver—in this case: the detector arrangement 12—are located at a similar position and backscattering is used for LIDAR measurement, the light propagation time is twice this, that is to say 2×n×r/c. It is therefore possible to calculate very exactly how long after the transmission of the light pulse this will be received again from a defined range.

As is illustrated in FIGS. 4a and 4b, in the case of the direct reception Doppler LIDAR apparatus 10 described here and the measurement method which can be carried out using it, the detector 35 is actually switched on at an early stage ("exposure"). However, the entire detector arrangement 12 is now normally deactivated for example by the microchannel plate 34, which acts as a switch, and is activated at a switch-on time t1 only after a first time duration T1 has elapsed after transmission of a laser pulse 40 (FIG. 5), as a result of which the scattered light 18 is detected only from a range (measurement range) of at least r1=c*T1/2*n corresponding to the first time duration T1, which the light requires to travel from the beam source to the start of the desired measurement volume and, if appropriate, back to the detector. For the sake of simplicity, FIG. 1 shows a beam propagation direction or measurement direction parallel to the direction of flight. If a measurement is carried out at an angle α to the direction of flight, then the first time duration T1 as well as a second time duration T2 within which the detector arrangement is switched to be active (between the switch-on time t1 and a switch-off time t2) must be divided by cos α, in order to calculate the range r in front of the aircraft. If r1 and r2 do not denote the range in front of the aircraft, but the range between the LIDAR and the measurement volume, then this division is not carried out.

Furthermore, as can likewise be seen from FIG. 4a, in the case of the measurement method described here and the correspondingly designed direct reception Doppler LIDAR apparatus 10, the detector arrangement 12 can be deactivated again at the switch-off time t2 after the second time duration T2, while the detector 35 is still in the "exposed" state, as a result of which only the scattered light 18 in the range interval between r1=c*T1/2*n and r2=c*(T1+T2)/2*n (measurement depth) (cf. also FIG. 1) is detected, and therefore the maximum measurement range r2 which the light requires to travel from the beam source to the end of the desired measurement volume and, if appropriate, back to the detector 35 can be selected as a function of measurement parameters such as the required intensity of the detected signal, with the detector still being in the "exposed" state. The switching device 24 is used for switching on and off.

If, for example, a CCD camera is used as the detector 35, which has a typical exposure time of 16 milliseconds at a frame rate of 60 frames per second, this image is actually exposed for only a fraction of this time. This is illustrated in more detail in FIGS. 4a, 4b, where the upper illustration shows the exposure times for the CCD camera, and the lower illustration shows the time durations T1, T2 and times t1, t2 (FIG. 4a) for the switching device. The exposure is therefore carried out precisely such that only the light which is scattered at the desired range is detected, see FIGS. 4a, 4b. In addition, background light also enters only during this short time. However, this results in only a comparatively small proportion of the background radiation being detected while, if the detector arrangement 12 were to be open all the time throughout the entire exposure time of 16 ms, background light would be recorded.

FIG. 4b illustrates the case of detection of a plurality of laser pulses (four in this example) during a single (camera or detector) exposure time. The switching with the time durations T1 and T2 is carried out appropriately often in a manner corresponding to the number of laser pulses to be recorded. This clearly illustrates the advantage that correspondingly less background light is recorded (in the time periods n*T1+x) by switching off the detector arrangement after the second time duration T2 for a duration T1+x up to the detection of the next laser pulse, therefore considerably improving the signal quality, while a plurality of pulses are integrated in this way to form a single overall measurement (exposure time).

Figure 5:
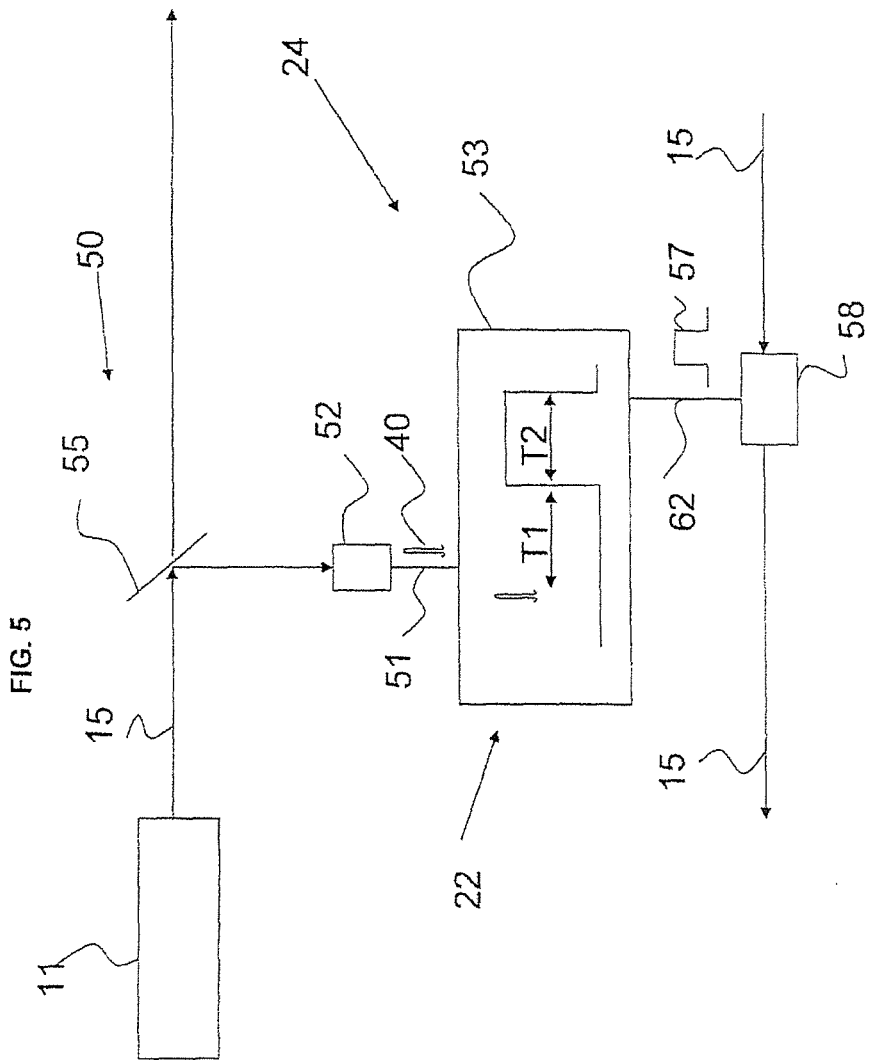
FIG. 5 shows a schematic illustration of the arrangement of a counter, which is triggered by a part of a transmitted beam and supplies a switching pulse to a switching device for switching the detector arrangement.

In this case, it is advantageous for the switching time τ for activation and/or deactivation of the detector arrangement 12 to be as short as possible. These switching times τ (flanks) are illustrated in more detail in FIG. 9. In particular, this switching time τ should be very much less than 1 millisecond, preferably in the region of nanoseconds or microseconds. This can be achieved, for example, by a correspondingly fast switching element in the switching device 24, for example a switch positioned in front of the detector 35, or by, for example, electrical switching of the output of the detector 35. FIG. 5 illustrates an example of an arrangement of the switching device 24 in more detail, to which reference is made in the following text.

FIG. 5 shows the laser source 11 with the transmitted beam—transmitted laser beam 15—and an output device 50 for outputting a portion of the laser beam 15 to a photodetector 52: the photodetector is connected to a counter 53 via an input interface 51. The counter 53 is also shown, which is part of the control device 22 for controlling the timing of activation/deactivation of the detector arrangement 12, and a switching element of the switching device 24, in this case illustrated in the form of a switch 58, which is arranged in the path of the scattered light 18 which is directed to the detector 35 and is to be detected. The switch 58 could be formed by the microchannel plate 34 or by some other switch.

Triggering for switching on and off is carried out by means of a suitable clock or the counter 53, or other suitable means, which themselves have an input for detection of the transmitted laser pulse 40. In the illustrated example, the counter 53 has an input interface 51 with the photodetector 52, which receives a small fraction of the transmitted laser beam 15. For this purpose, the output device 50 is provided with an obliquely positioned window 55, through which the fraction is output. Alternatively, the output apparatus can use scattered light on the outlet window or on an output mirror of the laser source 11, etc.

An appropriately preprocessed electrical output signal is supplied from the input interface 51 to the counter 53, thus allowing the first time duration T1 to be related to this time at which the laser pulse 40 is transmitted.

The counter 53 supplies a switching signal 57 to the input 62 of the switch 58. The switch 58 is arranged in the reception beam—scattered light 18—and passes this through to the detector 35, or does not, depending on the switching state.

As already mentioned, typical detectors 35 are cameras, for example CCD cameras or comparable cameras, that is to say also CMOS cameras by way of example, as well as so-called high-intensity cameras formed from the detector and switchable microchannel plate. Further possible detector groups include 2D photodetector arrays, line arrays of photodetectors, photo multipliers with concentrically arranged ring electrodes, or other 1D or 2D arrangements of photodetectors or else individual detectors.

As can be seen by comparing FIGS. 6a and 6b, various arrangements can be used as the "switch 58" for switching the detector 35 on and off.

FIG. 6a shows a switching unit 60 which has been placed in the beam path and may be in the form of a mechanical shutter, to the extent that it complies with the requirements for the short switching times τ of less than 1 ms, preferably in the region of nanoseconds or microseconds, or may be in the form of an electrooptical switch (for example electrooptical LiNbO3), an acoustooptical switch, a fiber-optic switch, a liquid crystal cell, a micromechanical switch (for example a micromirror or micromirror array) or an electrical switch. Those switches 58 which have the drive input 62 and are able to switch the detector 35 and/or the incident light in the reception path in front of the detector 35 appropriately quickly are particularly suitable for the switching unit 60.

Another switch, which is not illustrated in any more detail here but is likewise suitable for forming the switching device 24 in a corresponding manner, is comparable to the switching unit 60 but can be connected to the detector 35 and is able to appropriately quickly short-circuit the detector 35 or its output (for example before exposure).

When using CCD cameras as illustrated in FIG. 6b, switchable microchannel plates 34, in particular, are also used, which allow correspondingly fast switching over a relatively large area (as required for a CCD chip). Microchannel plates 34 such as these which can switch quickly can be switched either by controlling the acceleration voltage, or preferably by controlling a gate electrode, generally an electrode in the form of a network on the photo cathode, or by both at the same time, typically in the region of nanoseconds.

However, it is also possible to use a wide range of other switches, provided that they allow correspondingly fast switching.

The second time duration T2, which corresponds to a minimum measurement volume r2-r1 and which the light requires to pass through the measurement volume and if appropriate back, can now be selected as a function of system parameters such as the air speed of an aircraft 13 in which the direct reception Doppler LIDAR apparatus 10 is mounted, or other parameters which influence the required measurement range, wherein the time durations T1 and T2 or the times t1, t2 are either predetermined and are fixed, or can be controlled or regulated dynamically during a relatively long-lasting measurement operation (for example T1 being shorter for lower air speeds and longer for higher air speeds, so that the time between the measurement and "flying through" the measurement volume is constant).

Furthermore, the second time duration T2, which corresponds to a minimum measurement volume r2-r1 and which the light requires to pass through the measurement volume and, if appropriate, back, can likewise be selected as a function of measurement parameters such as the required intensity of the detected signal (for example T2 is shorter when the back-scattering intensity is low, therefore providing compensation by a relatively large back-scattering volume, or T1 is shorter when the back-scattering intensity is low, therefore likewise providing compensation by a shorter measurement distance).

Another option is now to adapt the second time duration T2, which corresponds to a minimum measurement volume r2-r1 and which the light requires to pass through the measurement volume and, if appropriate, back, as a function of system parameters such as the expected dynamics of the measurement signal, coherence or gradient of a measured air gust or of an air gust to be measured, etc.

In particular, the selection of the time can now be controlled or regulated dynamically throughout a longer-lasting measurement operation on the basis of the method proposed here, or else it can be predetermined to be fixed, depending on the requirement for the measurement and the inclusion in the overall system.

Figure 7:
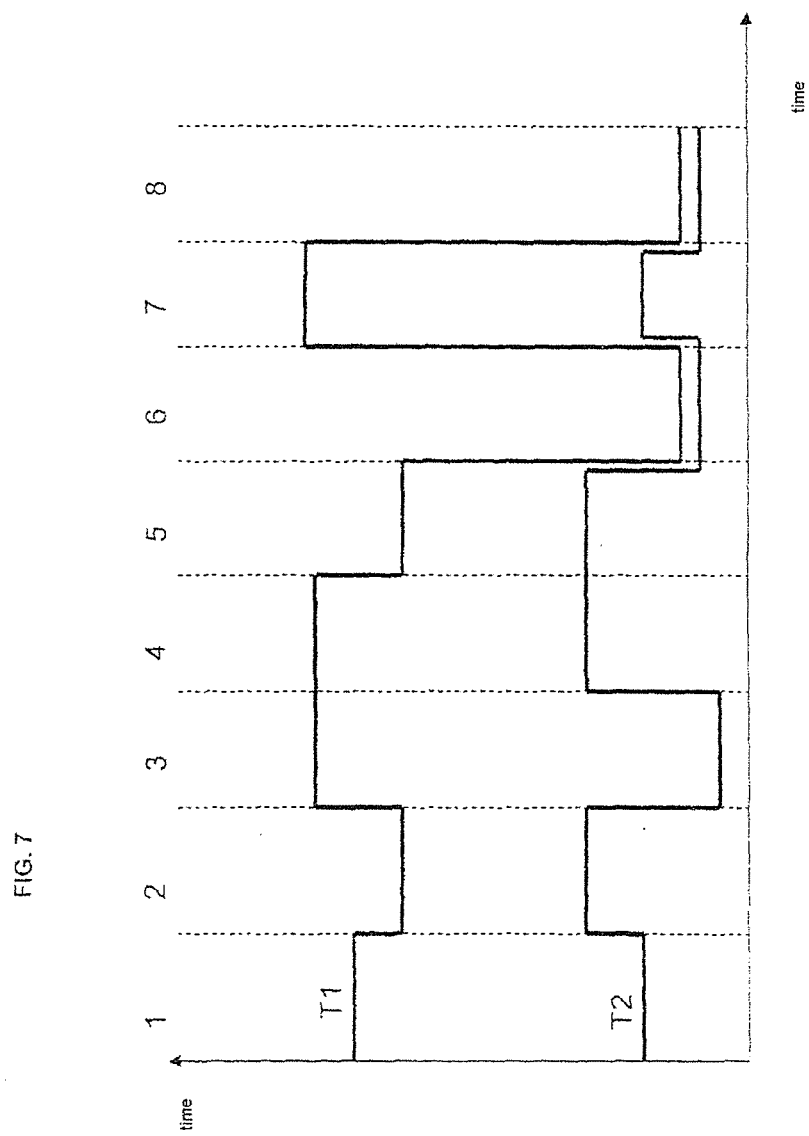
FIG. 7 shows a schematic diagram in order to illustrate one example of the choice of switching times T1 and T2 for different target measurement parameters.

As is illustrated in FIG. 7, to which the following text refers, the time durations T1 and T2 can also, for example, be selected on the basis of the requirement or sequentially to carry out different measurement tasks. In this case, FIG. 7 shows a longer measurement sequence with a plurality of individual measurements in the sections 1 to 8.

By way of example, when the direct reception Doppler LIDAR apparatus 10 is carried on an aircraft, a long measurement range can be selected for safety/in order to increase comfort, as is illustrated in sections 3 and 4 in FIG. 7. For this purpose, the first time duration T1 is selected to be long, as a result of which only ranges r1 at a relatively long distance are detected. Scattered light from all closer sections reaches the detector 35 before the selected switch-on time t1, and is therefore not detected. In contrast, a short measurement range with increased accuracy is selected in sections 2 and 5 of FIG. 7, in order to reduce the wing load. This is done by selecting the first time duration T1 to be a shorter value. A very short range is selected in sections 6 and 8 of FIG. 7, for optical measurement of air data by appropriate selection of a short first time duration T1. This different selection can be done automatically and successively, for example by selection in a predetermined sequence or on demand.

As shown, the measurement depth can also be matched to these requirements. For example, a large measurement depth is set for long range, that is to say to T2 long, as shown in section 4 of FIG. 7, or a short measurement depth can be selected for short range, as shown in section 1. Section 3 shows an example of the second time duration T2 being set for long range but for heavy back-scattering, for example in clouds. Section 1 describes the normal measurement conditions relating to this.

A further option is to shorten the first time duration T1 in FIG. 4b within an exposure from one laser pulse to the next such that the measurement volume remains constant despite the aircraft 13 itself moving in the air-related external coordinate system for each recorded laser pulse. Otherwise, the measurement volume would be shifted, corresponding to the aircraft movement, from one laser pulse to the next.

Furthermore, the detector 35 will not perceive any possible reflection on the window 14, or on a (dirt) layer located on it, by activation and deactivation of the detector arrangement 12 such that the first time duration T1 is greater than the time which the light requires to travel—distance 20—in FIG. 1 from the laser source to this window 14 and back again to the detector 35. This is particularly advantageous since scattered light on the outlet window resulting from surface scattering or dirt can be considerably more intensive than the wanted signal to be detected, and, depending on the circumstances, can therefore have an extremely disturbing effect on correct detection of the wanted signal. However, this can actually be suppressed by the direct reception Doppler LIDAR apparatus 10 as described here, and by the measurement method as described here.

Often, not only the change in the speed, but the speed itself, is intended to be measured in a LIDAR system as described above. It would not be sufficient just to measure the rate of change of the interference signal for this purpose. For example, in order to measure the speed itself, the change in the interference signal is measured with respect to a reference point (for example known speed or speed equal to zero). One possible way to use the direct reception Doppler LIDAR apparatus 10 described here is essentially to couple a portion of the transmitted laser light—laser beam 15—directly (that is to say without it being transmitted into the atmosphere) into the detector arrangement 12. Since this portion of the laser light is not subject to any scattering on particles which move relative to the system—particles 17a, 17b, 17c—the Doppler shift here is 0. The signal can therefore be used as a null-point reference signal.

Figure 8:
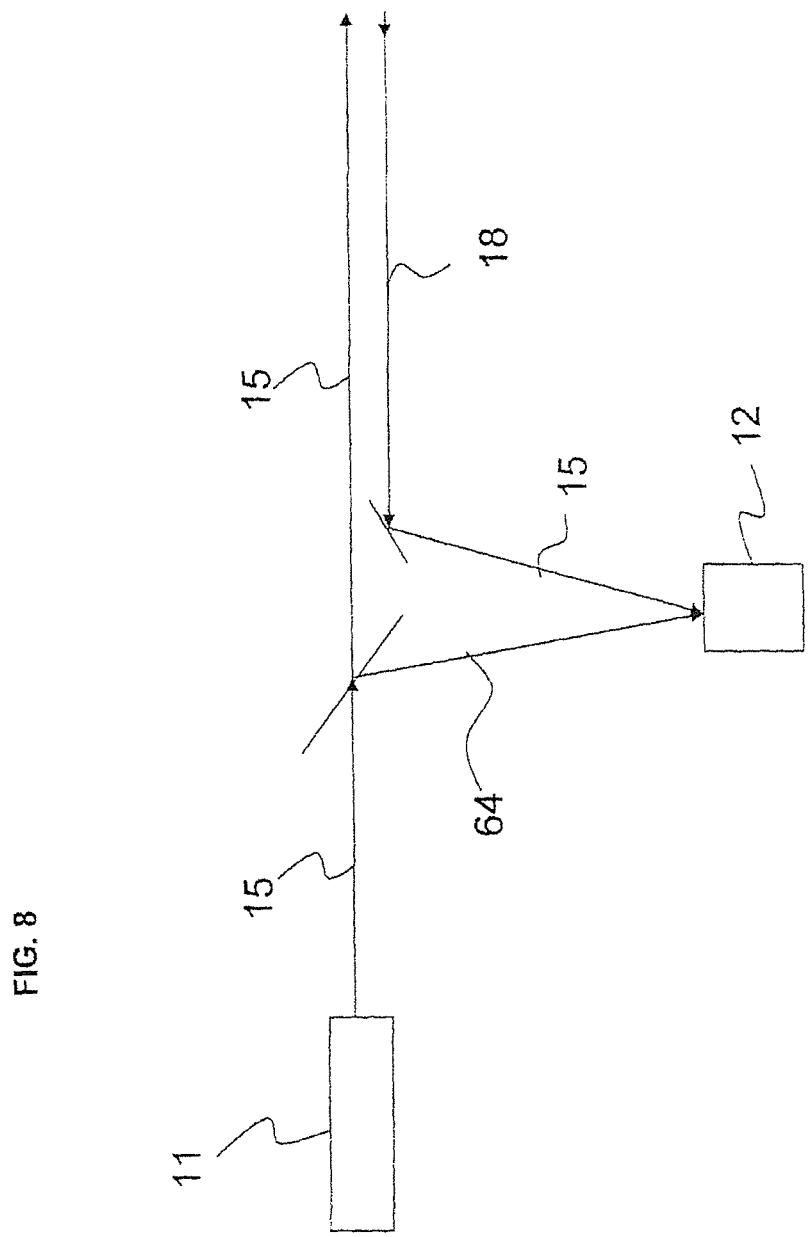
FIG. 8 shows a schematic illustration of an example of an arrangement for selective measurement of the direct laser beam as a reference or of the atmospheric back-scattered signal, with an appropriate choice of the times T1 and T2.

FIG. 8 shows one embodiment of the direct reception Doppler LIDAR apparatus 10, in which this signal is now obtained such that a portion—laser signal 64—of the signal transmitted by the laser source 11—laser beam 15—is passed to the detector arrangement 12, and the first time duration T1 is now chosen to be relatively short relative to the measurement in air, such that this laser signal 64 is registered on the detector 35. If the aim is to measure the laser signal 64 as a reference signal, the time durations T1 and T2 can now actually be chosen such that T1+T2 is shorter than the time before the laser light—scattered light 18—is received from the atmosphere. The choice of T1 and T2 therefore makes it possible to choose whether the reference signal or the atmospheric signal is detected.

Conversely, the reference signal can also be delayed, for example by means of a fiber coil, such that the choice of an appropriately matched first time duration T1 suppresses the signal scattered back from the atmosphere, such that this comes only from a very long measurement range and is therefore only extremely (negligibly) weak, but the delayed reference signal is actually detected optimally.

For practical reasons, it may be worthwhile additionally artificially lengthening the path length for the back-scattered signals—scattered light 15—from the atmosphere 16 by introducing a fiber coil into this reception path, such that the atmospheric signal arrives at the detector 35 clearly separated from the reference signal, thus making it easier to choose the signals as described by appropriate choice of the time durations T1 and T2.

By measuring a plurality of measurement directions, the solution described above can be used for each of these directions, or only for individual directions, such that a reference signal is used as a reference for the respective other measurement directions.

This measurement of the reference signal can now be carried out periodically or randomly throughout the entire measurement cycle of the LIDAR measurement, with the switching times of the detector 35 being correspondingly periodically or randomly varied.

What is claimed is:

1. A method for light detecting and ranging (LIDAR) measurement of a speed of a medium including air through which an aircraft is traveling, comprising:
    directing a laser pulse having a pulse duration at the medium; and
    operating a detector to perform a detecting operation during an exposure period to detect radiation that is within a spatial measurement range and is being subsequently emitted from the medium upon exposure to the laser pulse, the detecting operation including selecting the spatial measurement range having a magnitude such that the pulse duration is shorter than a time required for the laser pulse to pass through the spatial measurement range by operating the detector in a non-detecting state for a first time duration that begins at a time of emission of the laser pulse and in a detecting state for a second time duration that begins during the exposure period at the end of the non-detecting state, at least one of the first and second time durations being less than 500 μs.

2. The method as claimed in claim 1, wherein
    the directing includes emitting the laser pulse while the detector is inactive; and
    the operating of the detector in the detecting state includes activating the detector at a predetermined switching-on time after transmission of the laser pulse such that during the detecting state the detector detects a radiation pulse which has been scattered by the medium after being exposed to the laser pulse.

3. The method as claimed in claim 2, wherein
    the predetermined switching-on time begins when the detector begins to transition from the nondetecting state to the detecting state and ends when the detector achieves the detecting state, and has one of the following durations:
    less than 1 ms; and
    in a nanoseconds region.

4. The method as claimed in claim 2, wherein
    the predetermined switching-on time corresponds to a minimum measurement range of a laser source that emits the laser pulse.

5. The method as claimed in claim 2, wherein
    the emitting includes emitting the laser pulse from an optically transmissive element, such that the first time duration between the time of emission of the laser pulse and the switching-on time is greater than a duration of time during which the laser pulse travels from the optically transmissive element and back to the detector.

6. The method as claimed in claim 1, further comprising deactivating the detector at a predetermined switching-off time.

7. The method as claimed in claim 2, wherein
    the operating of the detector in the nondetecting state includes deactivating the detector at a predetermined switching-off time after activating the detector at the predetermined switching-on time.

8. The method as claimed in claim 7, wherein
    the second time duration between the switching-on time and the switching-off time is less than 1 μs.

9. The method as claimed in claim 8, wherein
    the second time duration corresponds to a desired measurement depth in the medium.

10. The method as claimed in claim 8, wherein at least one of the following correspond to a function of a measurement parameter relating to the medium
    the first time duration between the emission of the laser pulse and the switching-on time that is greater than a duration of time during which the laser pulse travels from an optically transmissive element and back to the detector;
    the second time duration;
    the switching-on time; and
    the switching-off time.

11. The method as claimed in claim 10, wherein
    at least one of the first time duration, the second time duration, the switching-on time and the switching-off time is based on a function of at least one of the following parameters:
    minimum intensity of the detected signal,
    maximum intensity of the detected signal,
    nominal intensity of the detected signal,
    movement speed of a LIDAR performing the measurement method,
    expected dynamics of the measurement signal, and
    at least one of coherence and gradient of a measured flow in the medium.

12. The method as claimed in claim 10, wherein
at least one of the first time duration, the second time duration, the switching-on time and the switching-off time is controlled dynamically.

13. The method as claimed in claim 8, wherein
at least one of the first time duration, the second time duration, the switching-on time and the switching-off time is controlled to vary the spatial measurement range.

14. The method as claimed in claim 5, wherein
the transmitting includes varying the first time duration in a moving measurement system based on a speed of the moving measurement system, from one measurement pulse to the next within an exposure process during which the medium is exposed to the laser pulse.

15. The method as claimed in claim 1, wherein
the directing and operating are performed for one of the following measurement durations:
a first measurement duration for safety of the aircraft and to improve passenger comfort in the aircraft;
a second measurement duration, shorter than the first measurement duration, to reduce loads on components of the aircraft; and
a third measurement duration, shorter than the second measurement duration, for optical measurement of air data pertaining to the air through which the aircraft is traveling; and
at least one of the first time duration, the second time duration, the switching-on time and the switching-off time is determined based on the measurement duration for which the directing and operating are performed.

16. The method as claimed in claim 8, wherein
a portion of the laser pulse provides a reference signal to the detector; and
the operating includes operating the detector to detect at least one of the reference signal and the radiation emitted from the medium by varying the first and second time durations.

17. The method as claimed in claim 16, wherein
the operating includes operating the detector to detect the reference signal periodically or randomly in a respective measurement cycle of the LIDAR measurement.

18. The method as claimed in claim 16, further comprising
propagating at least one of the reference signal and the radiation emitted from the medium through an optical delay path to delay the at least one of the reference signal and the radiation emitted from the medium before arriving at the detector.

19. An aircraft light detecting and ranging (LIDAR) apparatus comprising:
a laser source configured to emit a laser pulse having a pulse duration to a medium including air;
a detector configured to receive radiation which is emitted by the medium upon exposure to the laser pulse; and
a switching device configured to operate the detector to perform a detecting operation during an exposure period to detect radiation that is within a spatial measurement range and is being subsequently emitted from the medium upon exposure to the laser pulse, by operating the detector in a non-detecting state for a first time duration that begins at a time of emission of the laser pulse and in a detecting state for a second time duration that begins during the exposure period at the end of the non-detecting state, at least one of the first and second time durations being less than 500 µs to establish the spatial measurement range of a magnitude such that the pulse duration is shorter than a time required for the laser pulse to pass through the spatial measurement range.

20. The aircraft LIDAR apparatus as claimed in claim 19, further comprising
a control device configured to control at least one of the first time duration between the transmission of the laser pulse from the laser source and a switching-on time of the detector and the second time duration between the switching-on time and a switching-off time of the detector to select at least one of a measurement depth and a measurement separation for the medium.

21. The aircraft LIDAR apparatus as claimed in claim 19, wherein the detector includes at least one of the following light detection devices:
an imaging detector;
a light-sensitive element; and
a group of light-sensitive elements.

22. The aircraft LIDAR apparatus as claimed in claim 19, wherein
the switching device includes at least one switching element which is connected upstream of the detector to allow or block light passage to the detector.

23. The aircraft LIDAR apparatus as claimed in claim 22, wherein the switching element includes at least one of:
a switchable microchannel plate;
an electrooptical switch including electrooptical material;
a liquid crystal cell; and
a micromechanical switching element.

24. The aircraft LIDAR apparatus as claimed in claim 19, wherein
the switching device is connected to at least one output of the detector to perform the switching at the output of the detector.

25. The aircraft LIDAR apparatus as claimed in claim 19, further comprising
an optically transmissive cover element provided between the laser source and the detector; and
wherein the switching device is configured to deactivate the detector during a time in which the laser pulse has been emitted by the laser source and the radiation emitted by the medium arrives at the detector.

26. The aircraft LIDAR apparatus as claimed in claim 19, further comprising
a moveable carrier on which are disposed the laser source, the detector and the switching device; and
wherein the switching device controls at least one of a time of activation and a time of deactivation of the detector based on a speed of the moveable carrier.

* * * * *